US010890270B2

(12) United States Patent
Kurz et al.

(10) Patent No.: US 10,890,270 B2
(45) Date of Patent: Jan. 12, 2021

(54) SOLENOID VALVE, AND METHOD FOR PRODUCING A SOLENOID VALVE

(71) Applicant: Robert Bosch GmbH, Stuttgart (DE)

(72) Inventors: Edgar Kurz, Heilbronn-Horkheim (DE); Harald Speer, Freiberg (DE); Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 16/216,620

(22) Filed: Dec. 11, 2018

(65) Prior Publication Data

US 2019/0178409 A1  Jun. 13, 2019

(30) Foreign Application Priority Data

Dec. 13, 2017  (DE) .................. 10 2017 222 633

(51) Int. Cl.
  *F16K 31/06* (2006.01)
  *F16K 1/42* (2006.01)
  *B60T 8/36* (2006.01)
  *F16K 27/02* (2006.01)
  *F16K 39/02* (2006.01)

(52) U.S. Cl.
  CPC .......... *F16K 31/0675* (2013.01); *B60T 8/363* (2013.01); *F16K 1/425* (2013.01); *F16K 27/029* (2013.01); *F16K 31/0665* (2013.01); *F16K 39/024* (2013.01)

(58) Field of Classification Search
  CPC ............. F16K 31/0675; F16K 31/0665; F16K 31/0655; F16K 1/425; F16K 1/32; F16K 39/024; F16K 27/029; B60T 8/363; B23P 15/001
  See application file for complete search history.

(56) References Cited

U.S. PATENT DOCUMENTS

| 3,010,743 A | * | 11/1961 | Bengtson, Jr. ........... G05G 1/10 403/10 |
| 5,574,600 A | * | 11/1996 | Agro ..................... F21V 17/101 359/800 |
| 5,810,330 A | * | 9/1998 | Eith ....................... B60T 8/363 251/129.19 |

(Continued)

FOREIGN PATENT DOCUMENTS

DE  10 2015 218 263 A1  3/2017

*Primary Examiner* — Umashankar Venkatesan
*Assistant Examiner* — Andrew J Rost
(74) *Attorney, Agent, or Firm* — Maginot, Moore & Beck LLP (57) ABSTRACT

A solenoid valve includes a magnet assembly, a valve cartridge having a pole core, a valve sleeve connected to the pole core, an armature, a valve body, and at least one spring tongue. The armature is guided in an axially movable manner within the valve sleeve and is coupled to a closing element. The magnet assembly generates a magnetic field via energization of a coil winding. The magnetic field is configured to move the armature counter to a force of a restoring spring. The valve body is positioned within the valve sleeve. A main valve seat of the valve body forms a main valve with the closing element that sets a fluid flow between at least one first fluid opening and at least one second fluid opening. The spring tongue is arranged on the valve sleeve and forms a positively locking connection between the valve sleeve and the valve body.

12 Claims, 4 Drawing Sheets

(56) References Cited

U.S. PATENT DOCUMENTS

| | | | | |
|---|---|---|---|---|
| 6,032,692 | A * | 3/2000 | Volz | B60T 8/4872 |
| | | | | 137/630.14 |
| 7,198,249 | B2 * | 4/2007 | Nakayasu | B60T 8/363 |
| | | | | 251/30.04 |
| 7,954,511 | B2 * | 6/2011 | Kohlberger | B60T 8/363 |
| | | | | 137/614.18 |
| 2005/0173979 | A1 * | 8/2005 | Voss | B60T 8/363 |
| | | | | 303/119.2 |
| 2016/0298786 | A1 * | 10/2016 | Suzuki | F16K 31/0665 |
| 2017/0261113 | A1 * | 9/2017 | Sato | B60T 15/36 |

* cited by examiner

SOLENOID VALVE, AND METHOD FOR PRODUCING A SOLENOID VALVE

This application claims priority under 35 U.S.C. § 119 to patent application no. DE 10 2017 222 633.1, filed on Dec. 13, 2017 in Germany, the disclosure of which is incorporated herein by reference in its entirety.

BACKGROUND

The disclosure relates to a solenoid valve having a magnet assembly and a valve cartridge which comprises a pole core, a valve sleeve which is connected to the pole core, and an armature which is guided in an axially movable manner within the valve sleeve and is coupled to a main closing element, the magnet assembly generating a magnetic field by way of energization of a coil winding, which magnetic field moves the armature counter to the force of a restoring spring, and a valve body being positioned within the valve sleeve, a main valve seat of the valve body forming a main valve with the main closing element, which main valve sets a fluid flow between an at least one first fluid opening and an at least one second fluid opening, which solenoid valve is characterized in that at least one spring tongue is configured on the valve sleeve, which at least one spring tongue configures a positively locking connection between the valve sleeve and the valve body. Furthermore, a method for producing the solenoid valve is provided.

Figure 1:
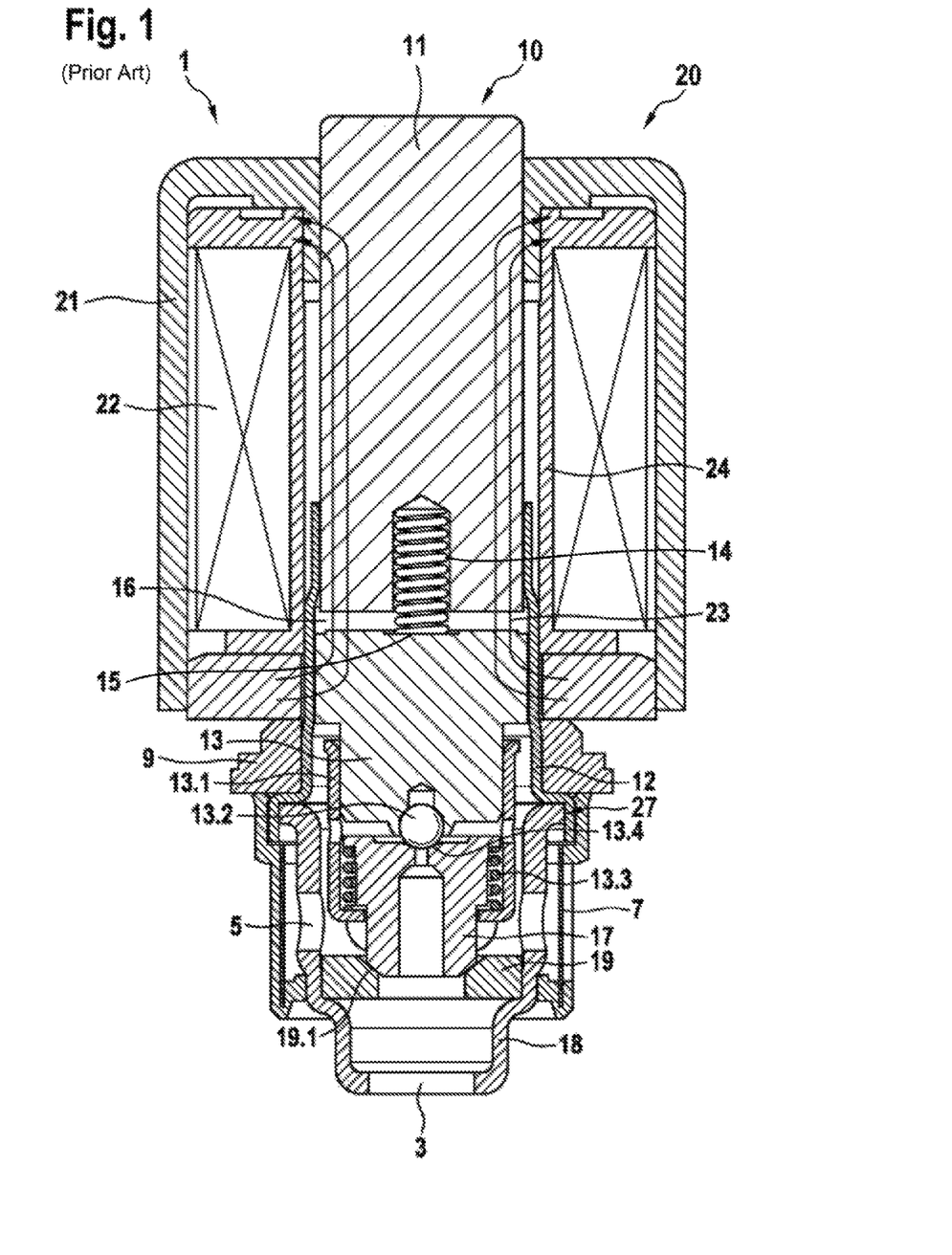
FIG. 1 shows a diagrammatic sectional illustration of a solenoid valve in accordance with the prior art.

Patent application DE 10 2015 218 263 A1 is known, for example, from the prior art. Said specification relates to a two-stage high pressure switching solenoid valve, as shown in FIG. 1. Valves of this design are also used in novel power-assisted brake systems, in order to switch the pedal feel sensor on or off.

As can be seen from FIG. 1, the solenoid valve 1 comprises a magnet assembly 20 which comprises a coil winding 22 which is arranged in a housing shell 21, and a valve cartridge 10 which comprises a pole core 11, a valve sleeve upper part 12 which is connected to the pole core 11, an armature 13 which is guided in an axially movable manner within the valve sleeve upper part 12 and is coupled to a main closing element 17, and a valve lower part 18 which is connected to the valve sleeve upper part 12. The combination of the valve sleeve upper part 12 and the valve lower part 18 can be called a valve sleeve 27. The valve lower part 18 comprises a valve body 19 with a main valve seat 19.1 which, with the main closing element 17, forms a main valve which is arranged between at least one first fluid opening 3 and at least one second fluid opening 5 and sets a fluid flow between the at least one first fluid opening 3 and the at least one second fluid opening 5. To this end, a compression spring 13.3 also acts on the main closing element 17. The valve cartridge 10 is introduced at least partially into the magnet assembly 20 by way of a pole core-side end, an upper end of the magnet assembly 20 bearing against the pole core 11, and a lower end of the magnet assembly 20 bearing against the valve sleeve upper part 12. The magnet assembly 20 generates a magnetic field by way of energization of the coil winding 22 which is applied to a winding carrier 24, which magnetic field moves the armature 13 counter to the force of a restoring spring 14. For this purpose, the armature 13 has a spring support 15 which at least partially receives and guides the restoring spring 14.

A magnetic flux 23 of the magnetic field which is generated runs from the coil winding 22 through the valve sleeve upper part 12 via the armature 13 and the pole core 11 back into the coil winding 22. Here, an air gap 16 which is configured in the non-energized state between the armature 13 and the pole core 11 in the valve sleeve upper part 12 is arranged in the region of the lower end of the magnet assembly 20. As can be seen from FIG. 1, furthermore, the valve lower part 18 is configured as a sleeve, into which the annular valve body 19 is pressed with the main valve seat 19.1. As a result of the two-stage embodiment, the solenoid valves 1 which are shown in each case have an auxiliary valve which is formed by way of an auxiliary valve sleeve 13.1, an auxiliary closing element 13.2 which is connected to the armature 13, and an auxiliary valve seat 13.4 which is arranged on a through opening on the main closing element 17, which is guided in an axially movable manner in the auxiliary valve seat 13.1, and has a small sealing diameter and throughflow, with the result that opening of the auxiliary valve is made possible counter to a high pressure which results in the case of a partially active and/or preloaded pressure build-up. The main valve with the main valve seat 19.1, which has a large seat cross section, and the main closing element 17 makes possible a large throughflow which is ideally unthrottled and which results in the case of a fully active or self-suctioning pressure build-up. The valve cartridge 10 can be calked via a calking disk 9 in a fluid block (not shown). In addition, an annular filter 7 is pushed onto the lower end of the valve cartridge 10.

In the prior art, the valve seat component of the main stage is as a rule pressed into the valve sleeve. The magnitude of the pressing-out force which can be achieved for the valve seat can be increased merely to a limited extent in the construction according to the prior art by way of an increase of the diameter pressing-on operation.

SUMMARY

In contrast, the valve according to the disclosure advantageously makes an alternative option possible for it, it being possible for the valve body to withstand relatively high pressing-out forces.

In accordance with the disclosure, this is made possible by way of the features which are specified in the claims. Further refinements of the disclosure are the subject matter of dependent claims.

The solenoid valve according to the disclosure having a magnet assembly and a valve cartridge which comprises a pole core, a valve sleeve which is connected to the pole core, and an armature which is guided in an axially movable manner within the valve sleeve and is coupled to a main closing element, the magnet assembly generating a magnetic field by way of energization of a coil winding, which magnetic field moves the armature counter to the force of a restoring spring, and a valve body being positioned within the valve sleeve, a main valve seat of the valve body forming a main valve with the main closing element, which main valve sets a fluid flow between an at least one first fluid opening and an at least one second fluid opening, is characterized in that at least one spring tongue is configured on the valve sleeve, which at least one spring tongue configures a positively locking connection between the valve sleeve and the valve body.

This is understood to mean that a positively locking connection for fixing the position of the valve body takes place. Positioning of the valve body is to be understood to mean that the valve body is introduced into the valve sleeve until it reaches a defined position/location and/or height. The introduction takes place, in particular, as pressing in. In particular, the positively locking connection is provided to prevent possible pressing of the valve body out of its defined position, and/or to increase the resistance against possible pressing out. Pressing out is understood if, for example, the valve body has been introduced and positioned into the valve sleeve by means of a non-positive press connection, but the position of the valve body is changed on account of, for example, high fluid forces, in a manner which corresponds to the axially acting fluid forces. As a result, both a non-positive and a positively locking connection between the valve body and the valve sleeve are preferably configured. Here, the positively locking connection is formed by way of what are known as spring tongues. The term "spring tongues" describes, in particular, the function of an element such that an elastically resilient (that is to say, reversible) deformation can take place, in particular in the radial direction. Furthermore, however, the spring tongues also make a positively locking connection possible between the valve sleeve and the valve body; therefore, the spring tongues have a corresponding rigidity, in particular in the axial direction.

Considerably higher pressing-out forces are advantageously made possible by way of a connection of this type, even without a use of an additional component or a changeover to larger dimensions or other material classes. This approach therefore also represents an inexpensive solution.

It is advantageously provided, furthermore, that the at least one second fluid opening is configured on the valve sleeve. The proposed connection by means of spring tongues and/or the configuration of the geometry of the spring tongues represents/represent a reliable and at the same time inexpensive solution, since no additional components or joining processes are necessary.

In one advantageous embodiment, the solenoid valve is characterized in that the spring tongue prevents a movement of the valve body which is introduced into the valve sleeve, counter to its direction of introduction.

It is provided here, for example, that the positively locking connection is positioned in such a way (that is to say, is configured at a defined location) that, in particular, a movement of the valve body in a defined direction is prevented. For example, pressing of the valve body into an opening of the valve sleeve takes place during the assembly in the direction of the target position. Movement of the valve body back in the direction of the opening of the valve sleeve is then to be prevented by way of the positively locking connection which is configured after the valve body is pressed in.

In one possible refinement, the solenoid valve is characterized in that the valve sleeve has a contour stop for the valve body, the contour stop being configured, in particular, in such a way that a movement of the valve body in the direction of introduction is prevented. This is understood to mean, for example, that the valve body is fixed without play, for example, between a contour stop and the spring tongues.

In one preferred embodiment, the solenoid valve is characterized in that the spring tongue is formed by way of a remaining part region of the valve sleeve, which remaining part region is situated within a U-shaped cutout of the valve sleeve.

This is understood to mean that a cutout is introduced into the valve sleeve. That material of the valve sleeve which remains in the interior of the cutout forms a tab. After the subsequent plastic deformation, said tab forms the spring tongue. The cutout can have a U-shape. Here, the U-shape can have a polygonal/angular shape or a rounded/soft shape. The U-shape is oriented in such a way that the opening of the "U" points in the direction of the opening of the valve sleeve, through which opening the valve body is introduced.

It goes without saying that alternative shapes which are suitable for the configuration of a spring tongue of this type are also possible.

In one alternative development, the solenoid valve is characterized in that the spring tongue has an elastic spring action.

This is understood to mean that the plastically deformed tabs have a spring action. Here, the spring action is present substantially in the radial direction. In this way, it can be achieved that, in the case of an introduction of the valve body, the inwardly deformed spring tongues yield outward in an elastically resilient manner, in order to make the introduction of the valve body past the spring tongues possible. Furthermore, the spring tongues snap back into the defined deformed position as soon as the valve body has passed the spring tongues and has reached its end position, and prevent a return movement of the valve body by means of a positively locking connection.

In one advantageous refinement, the solenoid valve is characterized in that the spring tongue is deformed plastically.

This is understood to mean that the spring tongue is formed in one piece from the valve sleeve or the valve lower part. A tab-shaped region is separated, for example, by way of a punching process. Said region is deformed plastically in such a way that a spring tongue is formed. An elastic spring action can advantageously be achieved by way of a spring tongue of this type, in order to make an introduction of the valve body possible, and also in order to achieve a positively locking connection between the valve sleeve and the valve body.

In one possible embodiment, the solenoid valve is characterized in that the spring tongue is deformed inward in relation to the valve sleeve.

This is understood to mean that a tab-shaped region is bent, in particular, inward, in relation to the valve sleeve. That is to say, the tabs are pressed inward, for example, from the outside by means of a radial action of force, until an irreversible deformation takes place. Here, the desired angle can be set very accurately. For example, a deformation between 2° and 10° is advantageous. As an alternative, deformations of up to 20° are also conceivable. By way of the deformation of the tabs in an inward direction, spring tongues can advantageously be produced which also make the desired positively locking connection possible. By means of the plastic deformation of the spring tongue inward in relation to the valve sleeve, the positively locking connection is therefore configured between the valve sleeve and the introduced valve body; as a result, with consideration of the elastic spring action of the inwardly deformed spring tongues, an introduction of the valve body into the valve sleeve is likewise made possible.

In one preferred development, the solenoid valve is characterized in that a multiplicity of spring tongues are configured, and the spring tongues are distributed uniformly over the circumference.

This is to be understood to mean that a plurality of spring tongues are configured. A multiplicity of spring tongues, for example three spring tongues, are advantageously provided. Two or four or five spring tongues can of course also be provided. The spring tongues are advantageously distributed uniformly, or at identical angles, over the circumference of the valve sleeve. For example, three spring tongues are configured so as to be offset by in each case 120° with respect to one another.

In one alternative embodiment, the solenoid valve is characterized in that a multiplicity of second fluid openings are configured, and at least one of the second fluid openings is configured within a spring tongue.

This is understood to mean that a functional integration takes place, with the result that the spring tongue also assists the fluid flow on the basis of the existing fluid opening. As a result, the merely limited circumference of the valve sleeve can advantageously be utilized in an optimum manner.

In one advantageous refinement, the solenoid valve is characterized in that the valve sleeve is configured in two pieces and comprises a valve sleeve upper part and a valve lower part, the valve body being positioned in the valve lower part.

In one possible embodiment, the solenoid valve is characterized in that at least one of the following features is configured in the valve lower part:
the at least one second fluid opening,
the at least one first fluid opening,
the positively locking connection between the valve sleeve and the valve body,
the one or more spring tongues.

Furthermore, in accordance with the disclosure, a method is provided for producing a solenoid valve having a magnet assembly and a valve cartridge which comprises a pole core, a valve sleeve which is connected to the pole core, and an armature which is guided in an axially movable manner within the valve sleeve and is coupled to a main closing element, the magnet assembly generating a magnetic field by way of energization of a coil winding, which magnetic field moves the armature counter to the force of a restoring spring, and a valve body being positioned within the valve sleeve, a main valve seat of the valve body forming a main valve with the main closing element, which main valve sets a fluid flow between an at least one first fluid opening and an at least one second fluid opening. The method is characterized in that the valve sleeve has at least one spring tongue, by means of which a positively locking connection between the valve sleeve and the valve body is configured by means of the spring tongue.

With regard to a more detailed description and advantages of the method for producing the solenoid valve, reference is to be made to the previous comments with respect to the solenoid valve itself.

In one advantageous embodiment, the method is characterized in that, in order to configure the positively locking connection between the valve sleeve and the valve body by means of the spring tongue, an axial press-on operation takes place during an introduction of the valve body into the valve sleeve, in such a way that the spring tongue snaps over an upper edge of the valve body.

This is to be understood to mean that the system can be set in terms of force and tolerances in such a way that the fixing is without play. To this end, the system can be designed in such a way that the valve body is pressed somewhat beyond its theoretical end position in the elastic region/is displaced axially, until the spring tongues of the valve sleeve snap over the upper edge of the pressed-in valve body. After the axial relief, the valve body is then seated fixedly between the contour stop and the spring tongues of the valve sleeve.

In one possible refinement, the method is characterized in that the production of the spring tongue comprises a punching operation or a peeling cut.

In one preferred embodiment, the method is characterized in that the production of the spring tongue comprises a plastic deformation of the spring tongue inward in relation to the valve sleeve.

This is to be understood to mean that the deformation of the punched-out tab-shaped region takes place in a downstream step; for example, also by means of a different tool. That is to say, a punching operation for producing the tab-shaped region first of all takes place. Said regions are bent inward in a next step. As an alternative, the deformation can also take place at the same time as the production of the tab-shaped regions. For example, the spring tongues can be produced by way of a peeling cut with simultaneous bending into their end position.

Furthermore, an apparatus for the production is provided in accordance with the disclosure; the apparatus for producing a solenoid valve. This is understood to mean, for example, a tool for carrying out the punching operation. This can also be a punch with a corresponding die geometry.

BRIEF DESCRIPTION OF THE DRAWINGS

It is to be noted that the features which are described individually in the description can be combined with one another in any desired, technically appropriate way, and can indicate further refinements of the disclosure. Further features and practicalities of the disclosure result from the description of exemplary embodiments using the appended figures, in which.

DETAILED DESCRIPTION

FIG. 1 shows a diagrammatic sectional illustration of a solenoid valve in accordance with the prior art. Reference is made in this regard to the comments in respect of the prior art.

Figure 2:
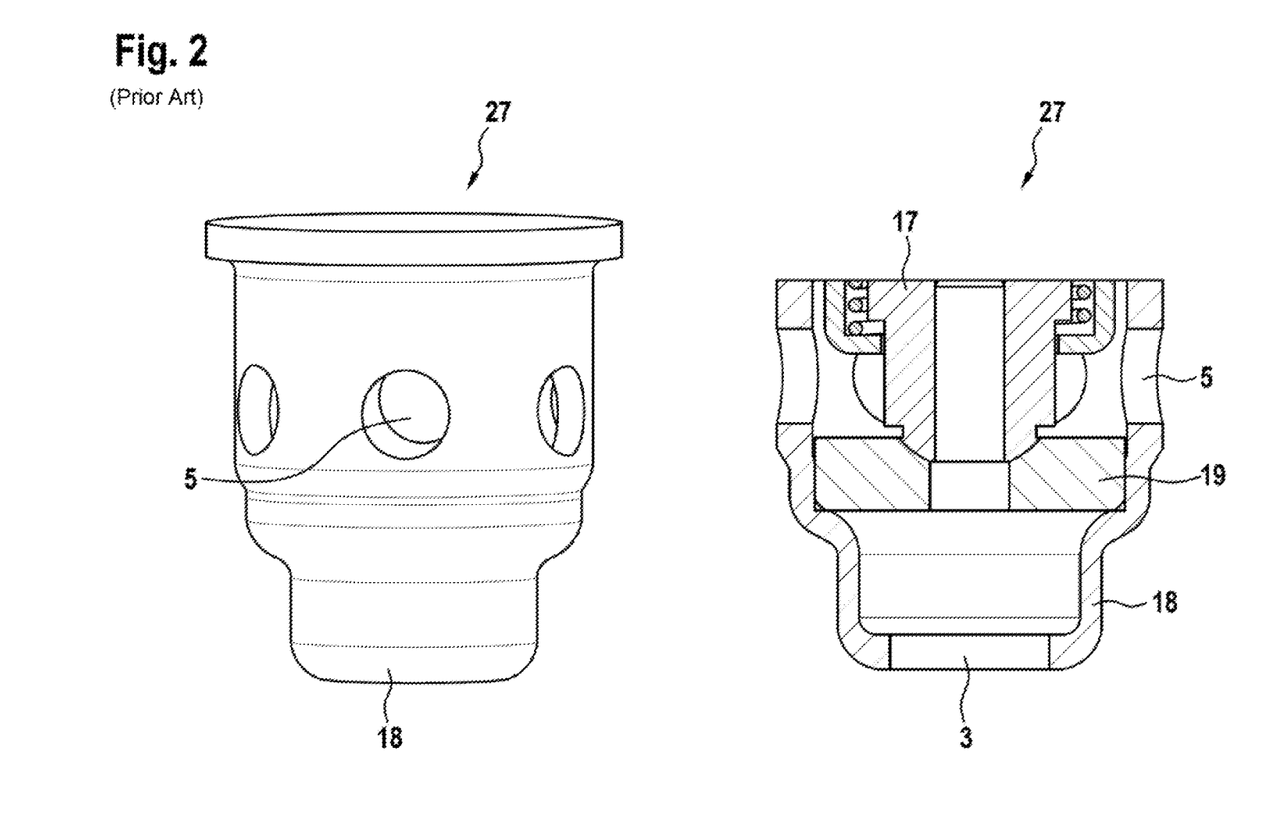
FIG. 2 shows diagrammatic illustrations of a part of a solenoid valve in accordance with the prior art.

FIG. 2 shows diagrammatic illustrations of a part of a solenoid valve in accordance with the prior art. Here, the valve sleeve 27 is configured in two pieces, the valve lower part 18 being shown. Here, the left-hand image half shows a three-dimensional illustration of the valve lower part 18 with the fluid openings 5. A sectional illustration of the valve lower part 18 is found in the right-hand image half. Furthermore, the valve body 18 and the main closing element 17 are shown here.

Figure 3:
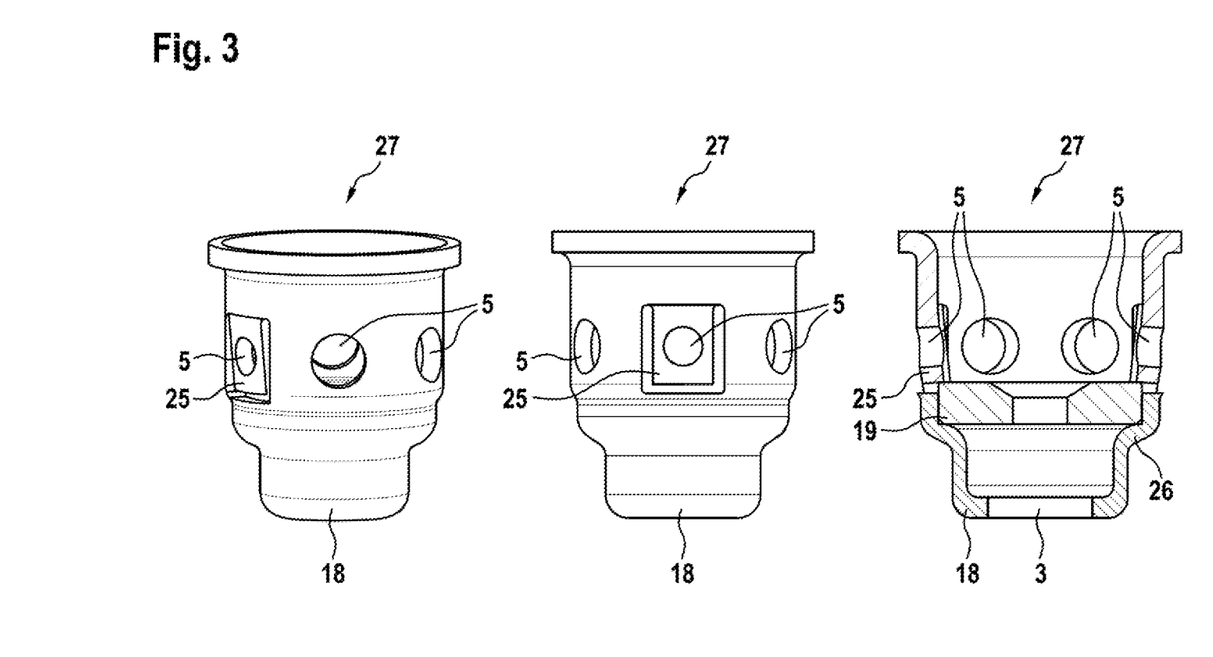
FIG. 3 shows diagrammatic illustrations of a part of a solenoid valve in accordance with one possible embodiment of the disclosure.

FIG. 3 shows diagrammatic illustrations of a part of a solenoid valve in accordance with one possible embodiment of the disclosure. Here, the left-hand depiction shows a three-dimensional illustration of the valve lower part 18 with fluid openings 5. A spring tongue 25 is configured in the left-hand region. It can also be seen here that the spring tongue 25 is deformed inward by a few degrees. Furthermore, a fluid opening 5 is configured within the spring tongue 25. The middle depiction likewise shows a three-dimensional illustration of the valve lower part 18. Here, however, the valve lower part is depicted in a somewhat turned position, in order to show the spring tongue 25 from the front. As a result, the selected exemplary shape of the cutout is clarified, by way of which the spring tongue 25 is formed. The right-hand depiction shows a sectional illustration with spring tongues 25. Here, the valve body 19 is also shown which is introduced into the valve lower part 18 as far as a contour stop 26. It can be seen here how a movement of the valve body 19 counter to its direction of introduction is prevented by means of the spring tongues 25. Here, the spring tongues 25 are snapped over the upper edge of the valve body and form a positively locking connection. Furthermore, the main closing element 17 and the first fluid opening 3 are shown.

Figure 4:
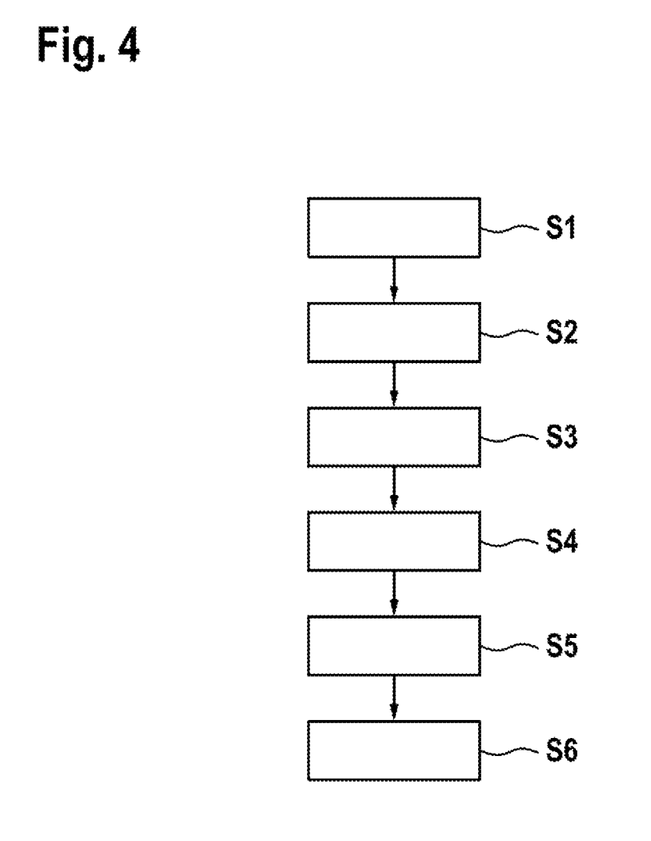
FIG. 4 shows a process illustration in accordance with one possible embodiment of the disclosure.

FIG. 4 shows an illustration of the method steps of one embodiment of the disclosure. Here, in a first step S1, the production of the basic shape of the valve sleeve or the valve lower part is brought about. In a second step S2, the punching process of the second fluid openings takes place. The punching operation is configured as a radial punching operation. In a next step S3, the punching process of the U-shaped cutouts takes place, which U-shaped cutouts form the tabs which form the spring tongues after the subsequent plastic deformation. Here, the steps S2 and S3 can also be configured as one working step. That is to say, all the fluid openings and tabs would be produced in only one process step. This does not require an additional step in the tool, but rather only a different punch, or a different die geometry. In the following step S4, a plastic deformation of the tabs takes place. Here, the tabs which are produced in the interior of the cutouts are bent inward by a few degrees and are deformed plastically. As a result, spring tongues which protrude toward the inside are produced on the valve sleeve. Instead of the punching process of the U-shaped cutouts for producing a spring tongue, the spring tongues can also be produced by means of a peeling cut. The spring tongues are advantageously produced by way of a peeling cut with subsequent bending into their end position.

In a next step S5, the introduction of the valve body into the valve sleeve or the valve lower part takes place. This takes place by way of axial pressing in. Here, the spring tongues yield outward in an elastically resilient manner until the upper planar face of the valve body has passed the lower edge of the tongue. The spring tongues then spring back and thus form a positively locking connection which prevents it being possible for the valve body to move axially out of the valve sleeve. The system can be set in terms of force and tolerances in such a way that the fixing is without play: to this end, the system can be designed in such a way that the valve body is pressed somewhat beyond its theoretical end position in the elastic region/is displaced axially, until the tongues of the sleeve snap over the upper edge of the pressed-in valve body. After the axial relief, the valve body is then seated fixedly between the contour stop and the spring tongues of the valve sleeve. Subsequently, in step S6, the installation of the joined-together components into the solenoid valve or the assembly of the solenoid valve takes place.

What is claimed is:

1. A method for producing a solenoid valve including a magnet assembly having a coil winding and a valve cartridge having a pole core, the method comprising:
   connecting a valve sleeve to the pole core;
   coupling an armature to a main closing element, the armature configured to be guided in an axially movable manner within the valve sleeve;
   generating a magnetic field via energization of the coil winding of the magnet assembly;
   positioning a valve body within the valve sleeve, the valve body including a main valve seat, the main valve seat forming a main valve with the main closing element; and
   forming a positively locking connection between the valve sleeve and the valve body with at least one spring tongue formed on the valve sleeve,
   wherein the magnetic field is configured to move the armature counter to a force of a restoring spring, and
   wherein the main valve is configured to set a fluid flow between at least one first fluid opening and at least one second fluid opening, a first opening of the at least one second fluid opening defined within a first spring tongue of the at least one spring tongue.

2. The method according to claim 1, wherein forming the positively locking connection comprises:
   an axial press-on operation during an introduction of the valve body into the valve sleeve in which the at least one spring tongue snaps over an upper edge of the valve body.

3. The method according to claim 1, further comprising:
   plastically deforming the at least one spring tongue inward relative to the valve sleeve.

4. A method for producing a solenoid valve including a magnet assembly having a coil winding and a valve cartridge having a pole core, the method comprising:
   connecting a valve sleeve to the pole core;
   coupling an armature to a main closing element, the armature configured to be guided in an axially movable manner within the valve sleeve;
   generating a magnetic field via energization of the coil winding of the magnet assembly;
   positioning a valve body within the valve sleeve, the valve body including a main valve seat, the main valve seat forming a main valve with the main closing element; and
   producing at least one spring tongue with a punching operation or a peeling cut;
   forming a positively locking connection between the valve sleeve and the valve body with the at least one spring tongue formed on the valve sleeve,
   wherein the magnetic field is configured to move the armature counter to a force of a restoring spring, and
   wherein the main valve is configured to set a fluid flow between at least one first fluid opening and at least one second fluid opening.

5. A solenoid valve, comprising:
   a magnet assembly including a coil winding, the magnet assembly configured to generate a magnetic field via energization of the coil winding;
   a valve cartridge including a pole core;
   a valve sleeve connected to the pole core;
   an armature configured to be guided in an axially movable manner within the valve sleeve and coupled to a main closing element;
   a valve body arranged within the valve sleeve and including a main valve seat, the main valve seat forming a main valve with the main closing element; and
   at least one spring tongue arranged on the valve sleeve and configured to form a positively locking connection between the valve sleeve and the valve body,
   wherein the magnetic field is configured to move the armature counter to a force of a restoring spring, and
   wherein the main valve is configured to set a fluid flow between at least one first fluid opening and at least one second fluid opening, a first opening of the at least one second fluid opening defined within a first spring tongue of the at least one spring tongue.

6. The solenoid valve according to claim 5, wherein:
   the valve body is introduced into the valve sleeve in a direction of introduction; and the at least one spring tongue prevents a movement of the valve body counter to the direction of introduction of the valve body.

7. The solenoid valve according to claim 5, wherein:
the at least one spring tongue is formed via a remaining part region of the valve sleeve; and
the remaining part region is arranged within a U-shaped cutout of the valve sleeve.

8. The solenoid valve according to claim 5, wherein the at least one spring tongue has an elastic spring action substantially in a radial direction.

9. The solenoid valve according to claim 5, wherein the at least one spring tongue is configured to deform plastically.

10. The solenoid valve according to claim 5, wherein the at least one spring tongue is configured to deform inward relative to the valve sleeve.

11. The solenoid valve according to claim 5, wherein:
the at least one spring tongue includes at least two spring tongues; and
the at least two spring tongues are distributed uniformly over a circumference of the valve sleeve.

12. The solenoid valve according to claim 11, wherein the at least one second fluid opening includes at least two second fluid openings.

\* \* \* \* \*